United States Patent [19]

Bursey, Jr.

[11] Patent Number: 5,582,759

[45] Date of Patent: Dec. 10, 1996

[54] CELLULOSIC MULCH FIRE EXTINGUISHANT AND RETARDANT

[76] Inventor: Paul Bursey, Jr., P.O. Box 190301, Little Rock, Ark. 72219

[21] Appl. No.: 310,317

[22] Filed: Sep. 22, 1994

Related U.S. Application Data

[63] Continuation-in-part of Ser. No. 926,301, Aug. 10, 1992, abandoned.

[51] Int. Cl.⁶ .............................. A62D 1/00; C09K 21/02; C09K 21/06
[52] U.S. Cl. .............................. 252/2; 252/601; 252/602; 252/603; 252/604; 252/607
[58] Field of Search .................................. 252/2, 3, 8.05, 252/601, 602, 603, 604, 607, 610, 62; 106/672, 674, 677, 681

[56] References Cited

U.S. PATENT DOCUMENTS

| | | | |
|---|---|---|---|
| 1,389,663 | 9/1921 | Ito | 426/655 |
| 1,849,569 | 3/1932 | Condorelli et al. | 426/655 |
| 3,621,917 | 11/1971 | Rosen et al. | 252/3 |
| 4,176,228 | 11/1979 | Hartung | 536/4 |
| 4,230,585 | 10/1980 | Bird et al. | 252/8.1 |
| 4,285,842 | 8/1981 | Herr | 252/607 |
| 4,581,378 | 4/1986 | Lazar et al. | 514/681 |
| 4,665,993 | 5/1987 | Balassa | 169/44 |
| 5,050,683 | 9/1991 | Sayles | 169/26 |
| 5,303,720 | 4/1994 | Banerjee et al. | 131/194 |

*Primary Examiner*—Sharon Gibson
*Assistant Examiner*—Joseph D. Anthony
*Attorney, Agent, or Firm*—Frank A. Lukasik; Robert Halpek

[57] ABSTRACT

A fire extinguisher and retardant material is formed from cellulosic mulch saturated with licorice juice. The licorice juice may be in the form of a foam, and the material may additionally include a binder and water. In order to increase the cohesiveness of the material, flexible strands of fine wire may be added to the mixture or a wire webbing may be used as a carrier material. Preferably, the cellulosic mulch is shredded paper.

9 Claims, 1 Drawing Sheet

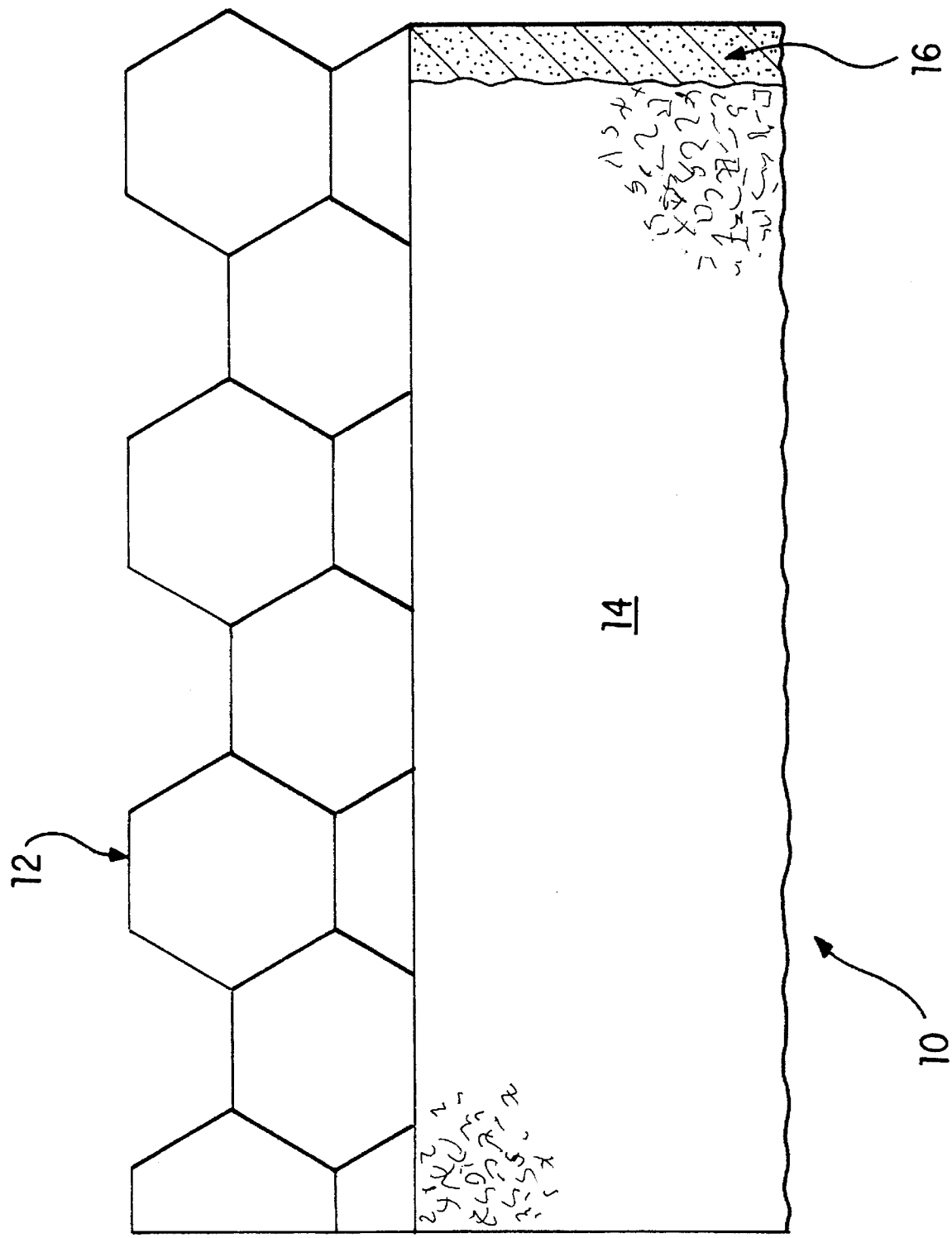

CELLULOSIC MULCH FIRE EXTINGUISHANT AND RETARDANT

This application is a continuation-in-part of U.S. application Ser. No. 07/926,301, filed Aug. 10, 1992, now abandoned which is incorporated herein by reference.

BACKGROUND OF THE INVENTION

The invention relates in general to fire extinguisher and retardant materials, and more particularly, to a cellulosic mulch wetted with liquid that tends to stick in place when applied on trees, buildings or the ground to present a barrier to advancing flames.

It is important to extinguish brush, tree and building fires and to provide effective barriers to the spread of such fires in the form of fire lanes forming a fire resistant area to prevent forest fires and brush fires from spreading over and beyond such barriers. There has been a never ending search for suitable materials with which to effectively fight such fires as fire extinguishers and barriers to the spread of fires. An effective fire extinguisher and barrier material may beneficially include water to take advantage of its cooling and smothering effect. Further, it is important that the fire extinguisher-retardant be quite dense to further aid in heat absorption from the fire. Many fires should also be smothered and the ability to stick to areas being treated is most important; thermal protection given by an insulative cover of foam can be quite effective in isolating combustible material from combustion temperatures and blocking oxygen from such combustible materials.

Water is the most useful substance for extinguishing fires, primarily due to its high heat of vaporization, 2260 kJ/kg, which removes heat from the combustion process. However, water readily runs off surfaces, leaving a coating too thin for heat removal or protection. Moreover, water has not been extremely useful in fighting forest fires, since when dropped from the air, it will often vaporize before reaching the fire. In order to overcome these disadvantages, it is know to use thickeners to increase the viscosity of water, such thickeners including both slurries and organic gels. Among the slurry materials are bentonite, ammonium phosphate and ammonium sulfate, which is particularly useful against forest fires.

Foams are also useful in combatting fires, particularly flammable liquid fires. However, foams are unstable by their nature, and have very low density, requiring replacement in large volumes to compensate for loss by evaporation.

SUMMARY OF THE INVENTION

It is therefore a principal object of this invention to extinguish fires.

Another object is to provide effective barriers to the spreading of fires.

A further object is to provide a fire extinguisher-retardant that will stick in place where applied or dropped.

Still another object is to provide a fire retardant that insulates combustible material from the heat of the fire.

To accomplish these and other objects, the invention provides a fire extinguisher and retardant material comprising cellulosic mulch wetted by licorice juice or foam substantially to the saturated state. The mulch which is preferably a recycled paper mulch, is highly moisture absorbent and liquid absorbent. The saturated mulch forms a mass which may vary in consistency from a highly viscous but pumpable liquid to cohesive lumps of fire retardant material, which, when applied or dropped on trees, buildings or the ground sticks thereto well enough to generally stay in place.

Binder material can also be added to the saturated mulch, in the form of bentonite and/or sanitary sludge, absorbent high density materials. Further, for some applications, flexible fine wire strands are included as an aid in maintaining lump mass integrity in use. Galvanized webbing in ¼", ½", 1", 1½" and 2" webbing strips on up to two feet wide and up to one hundred or more feet long is useable as a carrier for the saturated mulch fire retardant.

DETAILED DESCRIPTION OF THE INVENTION

The preferred fire extinguishing liquid of the invention is licorice juice, also known as glycyrrhiza, obtained from the rhizome and roots of various varieties of *Glycyrrhiza glabra* L. Licorice juice has long been used as a fire extinguishing material, as well as a sweetener and pharmaceutical ingredient. When used as a fire extinguishing material, the licorice juice is often in the form of a foam, obtained by aerating the juice. The foam can then be mixed into other formulations to make a fire extinguisher or retardant material, depending upon the type of fire and the extinguishing equipment utilized.

As used herein, the term "cellulosic mulch" applies to chopped or shredded plant-based mulch, particularly wood mulch. The term also applies to shredded paper or other cellulosic by-products, particularly recycled paper.

The mulch is generally used in shredded form, having excellent liquid absorption characteristics. The mulch, typically recycled waste paper, is mixed with licorice juice or foam, preferably to the extent where the mulch becomes substantially completely saturated with liquid. The amount of licorice juice or foam used for a particular amount of paper will depend upon the particular absorption characteristics of the mulch and the desired consistency of the product. With one type of mulch, this may be from 6–10 pounds of licorice juice, and preferably 8 pounds, per pound of mulch.

Preferably, the licorice juice is added to the mulch in a mixer, and mixing is continued until the desired consistency is obtained. The absorption of the licorice juice or foam by the paper results in a fire extinguishing material which is sticky and which has relatively high density. These properties result in an ability both to stick where dropped and to smother fires on impact. Moreover, the fire retardant material can be used as a firebreak to prevent further advancement of fires.

In order to facilitate absorption of licorice juice by the mulch, the licorice juice will normally be diluted with 3–6% by weight water. Additional water may be added, although water tends to reduce the fire retardant efficiency due to its rather rapid evaporation.

Bentonite and sewage sludge can be used, separately or in combination, as binders and absorbent high density materials enhancing the benefits of the fire extinguishing and retardant mixtures. Additionally, for some applications, flexible strands of fine wires in random lengths generally in the range from one-half foot to several feet long are included in various mixtures as an aid in maintaining lump (or gob) integrity while being applied in place. Further, webbing wire ¼", ½", 1", 1½" and 2" webbing strips on up to two feet wide and up to ten feet or more, even ten feet wide and up to one hundred feet long is useable as a carrier for the fire retardant.

The wire blankets utilized in conjunction with the fire retardant of the invention are generally known as "poultry wire" and are made of steel and can be galvanized or plain wire. This wire netting is utilized to hold together the shredded paper fire retardant which covers the webbing to a depth of from 4 to 12 inches. The blanket which is generally 2–10 feet wide and 10–5000 feet long, can then be applied as a firebreak or as a fire extinguisher on forest fires or structures. In the event additional thickness or width is required, an additional blanket may be placed on top of or along side a first blanket. The blankets would normally be carried on a spool, being rolled off to cover the desired area. After use, the wire should be recovered to prevent damage to the environment, especially the human and animal population which would become entangled in the wire blankets after the fire is extinguished.

The material used in the blankets are not to be pulverized. The mulch is only to be shredded in random lengths and saturated with the licorice juice or foam. Preferably the holes in the wire netting should be ¼ to ½ inch in diameter.

Another ingredient that may be added to the mulch fire extinguishing and retardant formulations is poultry droppings to the extent of as much as fifty percent by weight of the mixture. This not only serves as a binder, but also acts to add nutrients to the soil beneficially aiding new growth after a fire.

The consistency of the fire retardant product will depend on the consistency of the shredded paper or mulch and the degree of mixing with the licorice juice. Thus, a very finely shredded mulch mixed with the licorice juice for a long period will produce a viscous liquid fire retardant, having the consistency of thick gravy. This material may be pumped, or may be applied using a "cannon" with water as a propellant.

More coarsely chopped mulch produces a lumpy solid material which will be applied using a wire blanket.

The fire extinguisher and retardant of the invention utilizes materials with greater environmental and ecological advantages than those of the prior art. The paper, licorice juice and binders used according to the invention are non-polluting materials which can be recycled to the soil after use in extinguishing the fire.

BRIEF DESCRIPTION OF THE DRAWING

The sole drawing FIGURE is a plan view of a section of fire retardant blanket.

EXAMPLE

Shredded newspaper is prepared in a tub grinder. To the shredded newspaper is added 4% by weight water and licorice juice to saturation, forming a pulpy mass. This mass is deposited on a galvanized metal wire mesh having ½ inch openings to a depth of 4 inches to form a blanket.

As shown in the drawing FIGURE, blanket 10 is formed from wire 12 and fire retardant mass 14 thereon having a depth 16.

It should be understood that the above description of present invention is susceptible to various changes and adaptations that will readily occur to those skilled in the art and the same are intended to be comprehended as within the range of equivalents of the appended claims.

What is claimed is:

1. A fire extinguisher and retardant material that comprises a cellulosic mulch of shredded paper saturated with licorice juice.

2. The fire extinguisher and retardant material claim 1 wherein said material further contains a binder selected from the group consisting of bentonite, sewage sludge, and poultry waste.

3. The fire extinguisher and retardant material of claim 1 wherein said shredded paper mulch is a finely shredded mulch that forms a viscous fluid when mixed with said licorice juice for a long time.

4. The fire extinguisher and retardant material of claim 1 wherein said material additionally contains flexible strands of wire distributed throughout said material.

5. The fire extinguisher and retardant material of claim 4 wherein said wires have a length within the range of six inches to three feet.

6. The fire extinguisher and retardant material of claim 1 wherein said material additionally contains a wire webbing as carrier therefor.

7. The fire extinguisher and retardant material of claim 6 wherein said wire webbing is galvanized or non-galvanized steel wire having holes no larger than one half inch diameter.

8. The fire extinguisher and retardant material of claim 7 wherein said shredded paper mulch is a coarsely chopped mulch that forms a lumpy solid that covers said steel wire as a blanket.

9. A method for producing a fire retardant and extinguisher material comprising the steps of:
    a) obtaining a cellulosic mulch of shredded paper;
    b) adding to said mulch, while mixing, an amount of licorice juice sufficient to saturate said mulch; and
    c) continuing mixing until a desired consistency of saturated mulch is reached.

* * * * *